United States Patent [19]

Kaczerginski

[11] Patent Number: 4,702,873
[45] Date of Patent: Oct. 27, 1987

[54] METHOD OF MANUFACTURING A COMPOSITE INSULATOR

[75] Inventor: Alexandre Kaczerginski, Bellerive sur Allier, France

[73] Assignee: Ceraver, S.A., Paris, France

[21] Appl. No.: 868,159

[22] PCT Filed: Mar. 23, 1984

[86] PCT No.: PCT/FR84/00077

§ 371 Date: Oct. 30, 1984

§ 102(e) Date: Oct. 30, 1984

[87] PCT Pub. No.: WO84/03794

PCT Pub. Date: Sep. 27, 1984

Related U.S. Application Data

[63] Continuation of Ser. No. 674,956, Oct. 30, 1984, abandoned.

[30] Foreign Application Priority Data

Mar. 25, 1984 [FR] France .................. 83 04914

[51] Int. Cl.⁴ .............................................. B24C 45/14
[52] U.S. Cl. .................................. 264/135; 264/254; 264/263; 264/278
[58] Field of Search ................... 264/1.5, 36, 272.15, 264/272.16, 272.18, 272.19, 275, 278, 135, DIG. 54, 234, 255, 263, 171; 425/116

[56] References Cited

U.S. PATENT DOCUMENTS

| | | | |
|---|---|---|---|
| 1,163,701 | 12/1915 | Stiarns | 264/275 |
| 1,837,142 | 12/1931 | Bailey | 264/272.18 |
| 2,979,431 | 4/1961 | Perrault | 264/135 |
| 3,044,127 | 7/1962 | Alden | 264/272.18 |
| 3,089,199 | 5/1963 | Halacsy | 264/278 |
| 3,090,999 | 5/1963 | Karns | 264/275 |
| 3,259,680 | 7/1966 | Schilke | 264/275 |
| 3,363,040 | 1/1968 | Aoki | 264/278 |
| 4,102,973 | 7/1978 | Hanning | 264/278 |
| 4,107,451 | 8/1978 | Smith, Jr. | 264/272.15 |
| 4,243,628 | 1/1981 | Herold | 264/275 |
| 4,470,786 | 9/1984 | Sano et al. | 264/278 |
| 4,561,625 | 12/1985 | Weaver | 425/116 |

FOREIGN PATENT DOCUMENTS

| | | | |
|---|---|---|---|
| 740361 | 8/1966 | Canada | 264/272.19 |
| 2431141 | 1/1975 | Fed. Rep. of Germany | 264/275 |
| 599570 | 3/1948 | United Kingdom . | |
| 1353603 | 5/1974 | United Kingdom | 264/278 |

*Primary Examiner*—James Lowe
*Attorney, Agent, or Firm*—Kenyon & Kenyon

[57] ABSTRACT

A method of molding the insulating covering of an organic electrical insulator comprising a long central rod (3) having end fittings (5, 6). Retractable supports (11, 12, 21, 22) are disposed at regular intervals along an injection mold for the covering. The covering is injected, and at the end of injection, prior to vulcanization, the supports are retracted. The voids left in the mold (1, 2) by the supports are instantly filled by the injected material. Protective sleeves (24, 25) are interposed between the rod and the said supports.

18 Claims, 5 Drawing Figures

METHOD OF MANUFACTURING A COMPOSITE INSULATOR

This application is a continuation of application Ser. No. 674,956, filed Oct. 30, 1984, now abandoned.

The present invention relates to a method of molding the insulating covering of a long organic electrical insulator. Such an insulator includes a central insulating member, such as a solid or hollow rod, and its ends have metal end fittings.

The central rod is made of laminated material constituted by resin-coated fibers, and it is covered with an insulating covering in the form of a sheath which is generally provided with fins. The covering material is a hot-vulcanizable elastomer such as EPM, EPDM, silicone rubbers, polyurethanes, or the like, and it may be impregnated with inorganic material (alumina, silica, etc. . . . ).

The invention relates in particular to insulators which are more than 0.50 meter long, and which may be up to two or three meters long. If a rod of this length is placed in a mold, and elastomer is injected at a pressure of up to 500 bars, it is observed that the rod bends under the effect of the pressure of the material and the various flows filling the mold cavity. This leads to large variations in the thickness of the the covering from one end of the rod to the other. To ensure that there is a covering of a minimum thickness on the rod at all points along its length, one solution would be to increase quite considerably the quantity of elastomer that is injected. However, this has drawbacks: it increases insulator weight, vulcanization time, and cost.

Another solution has thus been sought in which the rod is held in place inside the mold during injection.

British Pat. No. 599 570 describes a method of injection molding an insulating covering on a metal insert in the form of a very thin pin. The covering material is thermoplastic, in other words it is heated to its softening or melting point and it is injected into a cold mold.

A series of very thin rods is provided in the mold which hold the metal insert in place throughout the filling of the mold by the thermoplastic material, and which are automatically retracted when the mold is completely full.

For an organic insulator, the problem posed is much more complex. Firstly the rod has a modulus of elasticity which is four or five times less than that of the above-mentioned metal insert. It thus has a greater tendency to bend than the metal insert. Further, in order for the elastomer covering to adhere properly to the surface of the rod, it is necessary to treat the rod prior to injection with adherization agents, which is not the case with a metal insert.

Furthermore, the covering material is hot vulcanized, which means that it is injected at an average temperature of about 100° C. into a hot mold whose temperature is about 180° C. to 200° C.

If the arrangement of the above-mentioned British patent were implemented, metal supports at mold temperature would come into contact with the adherization agents on the surface of the rod, and would immediately degrade them. This would lead to defects in the adherence of the covering on the rod which would to totally unacceptable for medium and high tension insulators.

The present invention aims to avoid these drawbacks.

The present invention provides a method of molding the insulating covering of an organic electrical insulator which includes a central rod of composite material having adherization agents on its surface, the said insulating covering being made of a hot vulcanized elastomer material, in which method retractable supports are provided in the mold for the said rod, the method being characterized by the fact that the said rod is provided with protective sleeves at least in the region of its surfaces that bear against the said supports, the thickness of the sleeves being less than the thickness of the said covering and the material of the sleeves being directly bondable to the material of said covering during vulcanization of said covering material, in that the material for the said covering is then injected, and in that the said supports are retracted at the end of injection and before vulcanization of the said covering.

The sleeves are advantageously made of an elastomer material, providing it is compatible with the elastomer of the covering. The sleeve elastomer may be non-vulcanized, or partially vulcanized, but for reasons of convenience in handling, it is preferably vulcanized.

A sleeve may be made by winding an elastomer tape around the rod, or by a split ring, or by a non-split ring which is stretched so as to be threaded over the rod without damaging the adherization agent, or by a ring which is molded in situ.

In another embodiment the various sleeves are united to constitute a continuous thin sheath. The sheath may be made by the known techniques of in situ molding or extrusion; it may also be applied to the rod by sheathing.

In another variant, the said sleeves are made of metal, e.g. aluminum alloy, cadmium steel, or galvanized steel. They are advantageously constituted by two half-rings which are crimped on the rod. It is also possible to make the sleeves directly on the rod by vacuum vaporization or by electroplating a metal which is compatible with such techniques (nickel, chromium, silver, or copper, for example).

All these varients make is possible to avoid damaging the gluing agents, and to obtain a covering which is uniform thickness from one end of the rod to the other.

In order to further optimize the conditions for obtaining this result, the injection channel positions are chosen relative to the retractable support positions so as to ensure that the said material takes up a balanced distribution around the rod. Thus the said injection channels are advantageously situtated substantially in the same cross section planes through the mold as the retractable supports.

For example, an injection channel and a support may be situated in line with each other on either side of the rod.

In another variant, the injection channel is orthogonal to two opposite supports situated on either side of the said rod; it may also be on the bisector of an angle different from 180° formed by the two supports.

It is also possible to provide distinct transversal planes for the injection channels and the retractable supports. In which case the sizes of the gaps between the supports should be determined to avoid any bending of the rod.

Other characteristics and advantages of the invention appear in the course of the following description of various implementations, given by way of non-limiting example.

Figure 1:
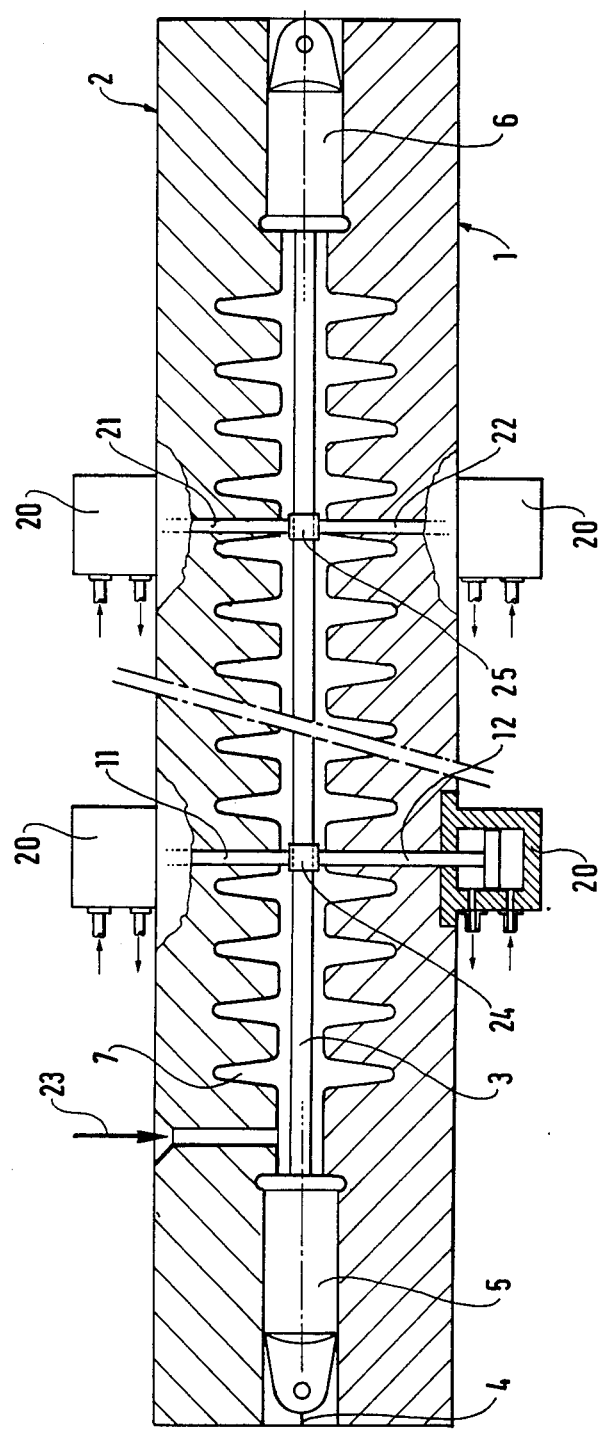
FIG. 1 is a very diagrammatic longitudinal section through a mold for performing the method of the invention.

FIG. 1 shows a mold having two parts 1 and 2 with a joint plane 4. A rod 3 provided with end fittings 5 and 6 is placed in the mold. The mold cavity for the finned covering of the rod 3 is referenced 7. Pairs of retractable supports 11, 12 and 21, 22 are provided at regular intervals along the rod 3. The supports are associated with actuators 20 which are automatically controlled by the machine for injecting the material, eg. EPDM, intended to form the finned covering of the rod 3. The actuators 20 could alternatively be controlled by means of a pressure sensor in contact with the material in the mold.

Arrow 23 illustrates very diagrammatically the injection under pressure of material into an injection channel leading to the cavity 7.

The rod 3 is provided on its outside surface with adherization agents, and the portions of its surface that bear against the supports 11, 12, 21, 22 are fitted with elastomer protective sleeves 24, 25 of a formula which is compatible with the material of the finned covering. The thickness of the sleeves is less than the final thickness of the covering at the points where the sleeves are situated.

Figures 2, 3:
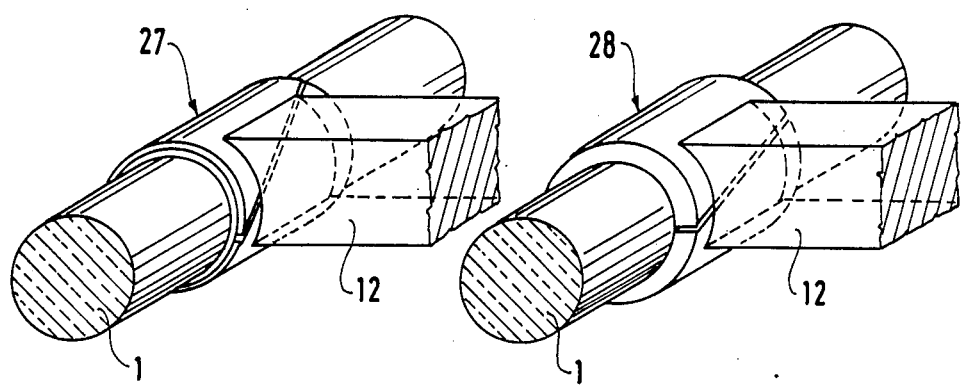
FIGS. 2 and 3 are very diagrammatic perspective views of two variants of a protective sleeve for the rod shown in FIG. 1.

FIGS. 2 and 3 show two examples of a sleeve disposed between the support 12 and the rod 3.

The sleeve 27 is obtained by spiral winding an elastomer tape, while the sleeve 28 is constituted by a split ring.

Any other form of sleeve may be envisaged, for example a closed ring which is widely stretched before being threaded over the rod so as to avoid damaging the adherization agents, and which is then shrunk onto the rod.

The elastomer of the sleeves may be in the raw state or in the partially vulcanized state. The partially vulcanized state makes the sleeves mechanically stronger, and in particular improves their resistance to the forces applied thereto by the injection flow. Whether or not they are vulcanized, the sleeves must include active sites to ensure that they are subsequently linked in a completely satisfactory manner with the injected covering.

In another variant, the sleeves are molded in situ on the rod, and are then in a vulcanized or a semi-vulcanized state.

In any case, once the end of injection is reached, the pairs of supports are retracted to the sides of the mold cavity 7, to form a part of the cavity wall. The pressure exerted on the injected material causes the voids left by the supports to be filled immediately. The covering is complete and vulcanization takes place. At the end of reticulation, the sleeves adhere properly to the rod, and the covering adheres properly to the rod and to the sleeves.

It is easy to see that the FIG. 3 sleeve could be replaced by a metal sleeve, in order not to damage the rod's adherization agents, it is preferable to crimp on two metal half-rings, or to make the sleeves by depositing metal rings prior to applying these agents.

Figure 4:
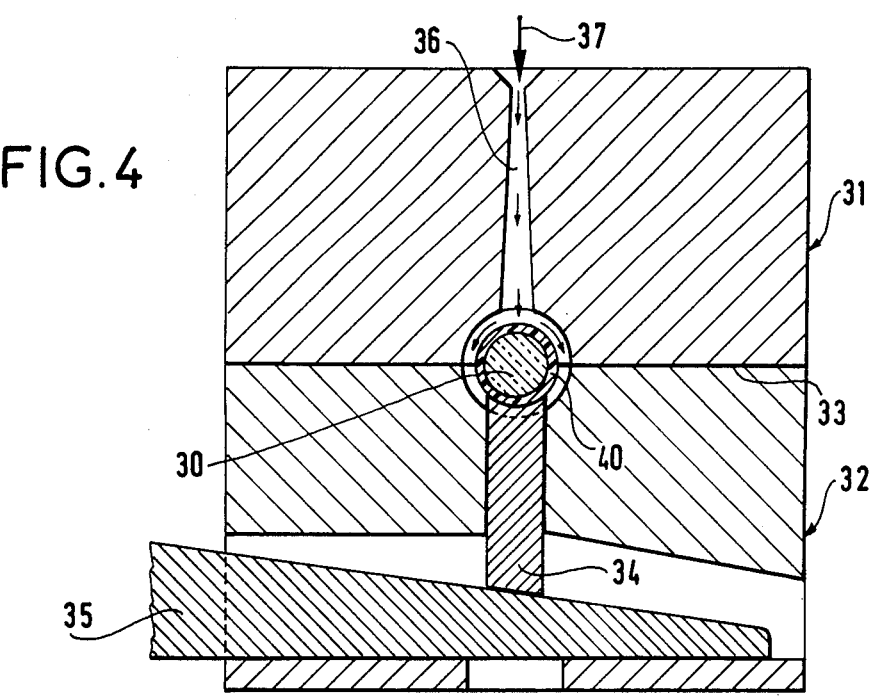
FIGS. 4 and 5 are cross sections through the retractable supports of one example of a mold, respectively before and after the end of injection.
Figure 5:
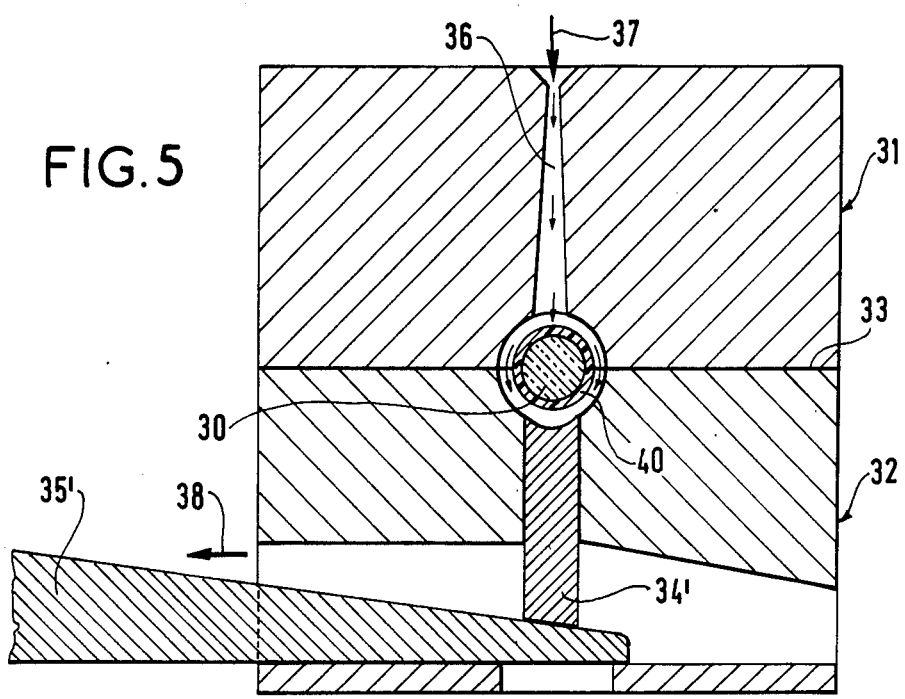

FIGS. 4 and 5 are a cross section through one embodiment of retractable supports.

A rod 30 is placed in mold having two parts 31 and 32 and a joint plane referenced 33. Regularly spaced supports 34 constitute a cradle for the rod. Each support 34 has top bearing face which is separated from the surface of the rod by a sleeve 40, and a sloping bottom bearing surface which cooperates with a wedge 35 suitable for being moved in translation (indicated by arrow 38 in FIG. 5).

An injection channel 36 for a flow 37 is situated in the plane of the figure, substantially in line with the support 34. Such an arrangements enables the flow 37 to come to a regular balanced distribution around the rod. FIG. 5 shows the support 34 being retracted to 34' after the wedge 35 has been translated to 35'.

In a variant which is not illustrated, but which can readily be imagined on the basis of FIGS. 1 to 3, the various protective elastomer sleeves are connected to one another in such a manner as to constitute a single sheath. Everything that has been said above concerning the nature of the sleeves, their state of vulcanization, and their thickness is applicable to the material of the continuous sheath. However, the sheath could be realized directly on the rod by molding or by extrusion, instead of being added thereto.

Naturally, the invention is not limited to the embodiments which have been described. In particular, there is no need for injection channels to be in the same cross section planes as the rod supports. However, the supports should always be distributed along the rod in such a manner as to ensure that the forces on the rod are in balance so that its bending remains within manufacturing tolerances.

The rod may be placed in the mold with its end fittings in place so that a complete isolator is obtained immediately after molding. In another variant, the end fittings are fixed on subsequently by any known sealing or sleeve coupling means.

Without going beyond the scope of the invention, any means may be replaced by equivalent means. Thus, the process of subjecting the material to injection per se may be replaced by the process known as "compression-transfer" or just "transfer".

What is claimed is:

1. A method for molding an elastomeric insulating covering on a central rod of composite material to form an organic insulator, the method including applying adherization agents to the surface of the rod, placing the rod in a mold, injecting hot-vulcanizable elastomeric material into the mold to form a covering around the rod, and hot-vulcanizing the elastomeric covering material, wherein the improvement comprises:

providing at least one protective sleeve around a corresponding at least one circumferential portion of the rod prior to placing the rod in the mold, the material of the sleeve being directly bondable to said hot-vulcanizable elastomeric material;

affixing the sleeve to the rod;

extending at least one retractable support into contact with each protective sleeve to support the sleeve and the rod in spaced relation to the walls of the mold without damage to the adherization agents prior to injecting the hot-vulcanizable elastomeric material into the mold; and retracting the at least one retractable support from contact with the sleeve at the end of injecting the elastomeric material into the mold so as to permit the injected elastomeric material to fill a void left by the withdrawn support before the elastomeric material is vulcanized, such that after hot-vulcanizing the elastomeric material, the sleeve is affixed to the rod and the elastomeric material adheres to the rod and to the sleeve.

2. A method according to claim 1 wherein the materials of said sleeve and said elastomeric covering are selected from the group consisting of EPM, EPDM, silicone rubbers and polyurethanes.

3. A method according to claim 2 wherein the at least one sleeve is in the unvulcanized state when placed around the rod.

4. A method according to claim 2 or 3 wherein the step of providing at least one protective sleeve around the rod comprises winding an elastomer tape around the rod.

5. A method according to claim 2 or 3 wherein the at least one sleeve is in the form of an elastomer split ring.

6. A method according to claim 2 or 3 wherein the step of providing at least one protective sleeve around the rod comprises stretching an elastomer ring in the circumferential direction and threading the stretched ring over the rod.

7. A method according to claim 2 or 3 wherein the step of providing at least one protective sleeve around the rod comprises molding the sleeve in situ around the rod.

8. A method according to claim 2 or 3 wherein the step of providing at least one protective sleeve around the rod comprises forming a single sheath on the rod.

9. A method according to claim 8 wherein the step of forming a single sheath on the rod comprises directly extruding the sheath around the rod.

10. A method according to claim 8 wherein the step of forming a single sheath on the rod comprises directly molding the sheath around the rod.

11. A method according to claim 8 wherein the step of forming a single sheath on the rod comprises directly sheathing the sheath around the rod.

12. A method according to claim 1 wherein the material of the at least one sleeve is metal.

13. A method according to claim 12 wherein the step of providing at least one protective sleeve around the rod comprises crimping metal half-rings around the rod to form each sleeve.

14. A method according to claim 12 wherein the step of providing at least one protective sleeve around the rod comprises electroplating at least one metal sleeve around the rod prior to applying the adherization agents to the rod.

15. A method according to claim 1 wherein the step of injecting hot vulcanizable elastomeric material into the mold comprises injecting said material at at least one location predetermined relative to the location of the at least one retractable support to ensure that the elastomeric material is uniformly distributed around the rod.

16. A method according to claim 15 wherein the step of injecting hot vulcanizable elastomeric material into the mold comprises injecting said material at a location in the same cross section plane as the location of the retractable support.

17. A method according to claim 15 wherein the step of injecting hot vulcanizable elastomeric material into the mold comprises injecting said material in line with, and on the other side of the rod from, the retractable support.

18. A method according to claim 15 wherein the step of extending at least one retractable support into contact with each protective sleeve comprises extending two supports from opposite locations on either side of the rod, and injecting hot vulcanizable elastomeric material into the mold comprises injecting the material at a location orthogonal to said two opposed supports.

* * * * *